United States Patent Office 3,589,984
Patented June 29, 1971

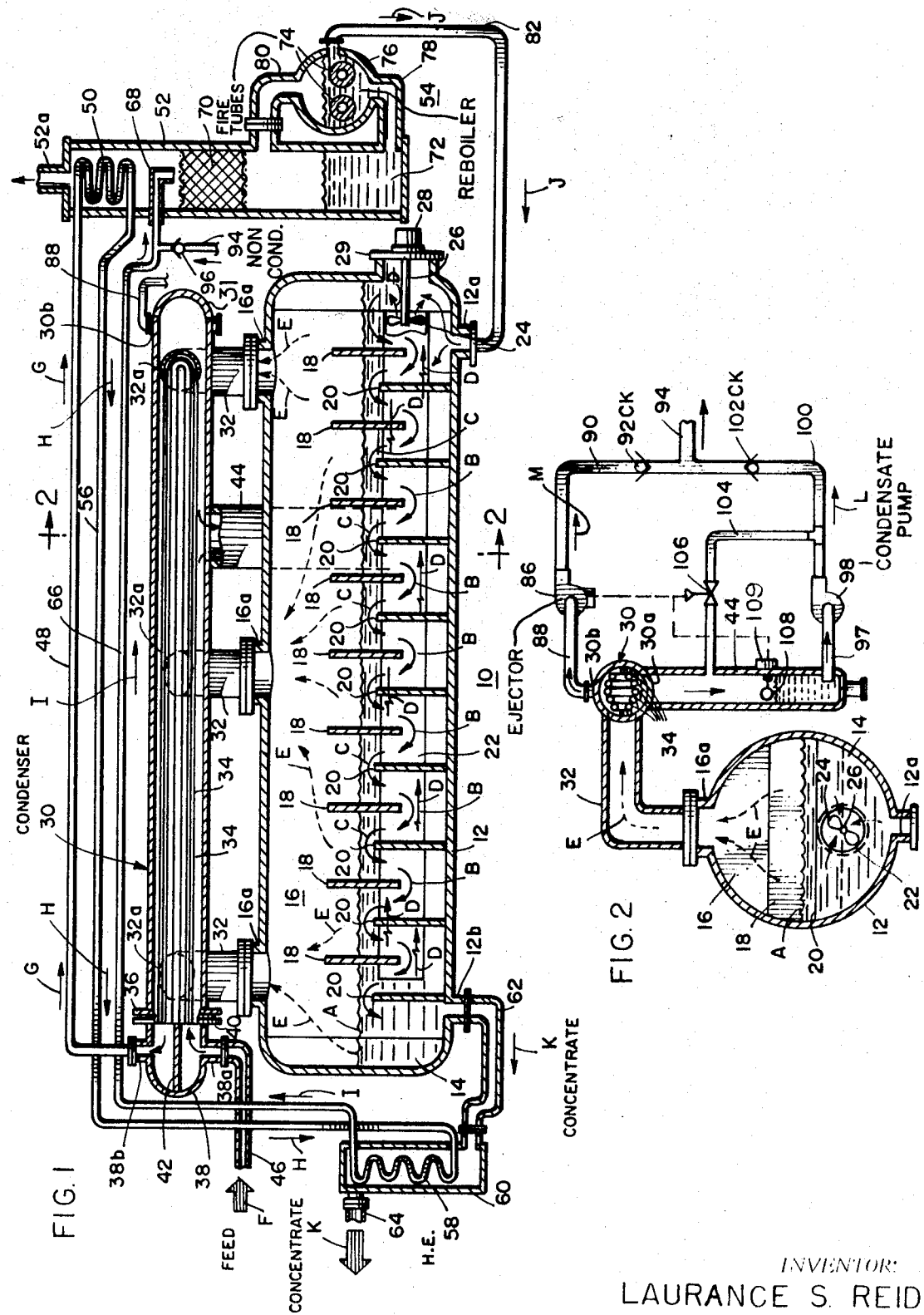

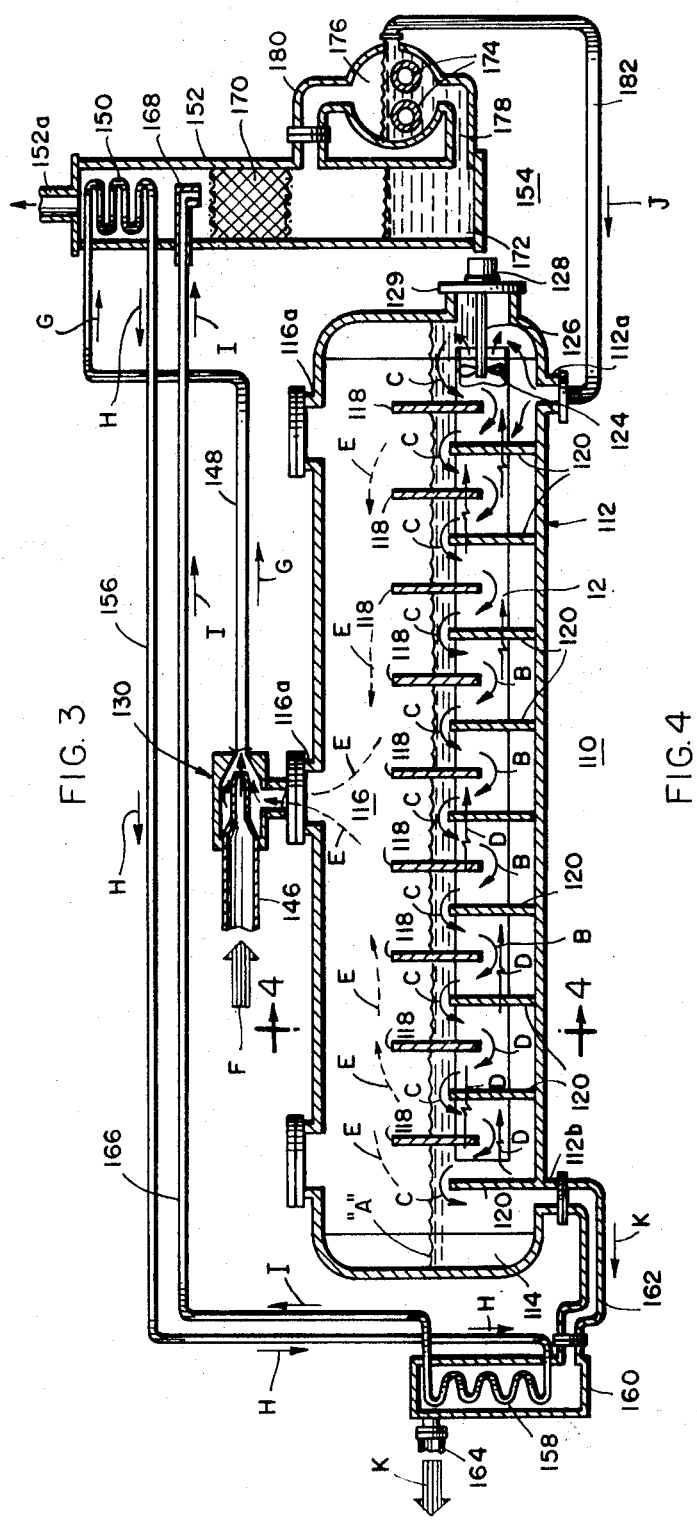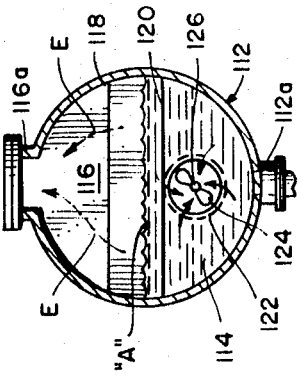

3,589,984
APPARATUS FOR DEHYDRATING
ORGANIC LIQUIDS
Laurance S. Reid, 601 Broad Lane,
Norman, Okla. 73069
Filed Nov. 21, 1968, Ser. No. 777,840
Int. Cl. B01d 3/00, 3/02
U.S. Cl. 202—173                             5 Claims

ABSTRACT OF THE DISCLOSURE

Apparatus for dehydrating a liquid mixture of organic liquid and water comprising a closed vessel having a lower liquid space for holding a quantity of the liquid mixture and an upper vapor space for holding a volume of vapor of the mixture in direct contact with the surface of the liquid to form a liquid-vapor interface. Means in communication with the vapor space is provided for reducing the partial pressure of the water-vapor therein below an equilibrium pressure across said interface whereby additional water in the liquid mixture is vaporized to pass into the vapor space, and means is provided for collecting and removing water from said vessel.

---

The present invention relates to a new and improved apparatus for dehydrating organic liquids and, more particularly, relates to a new and improved method and apparatus for dehydrating liquids, such as jet fuels, glycols, gasolines, liquid propane, and hydrocarbons.

It is an object of the present invention to provide a new and improved apparatus for dehydrating organic liquids, and, more specifically, it is an object to provide a new and improved apparatus which is capable of more completely removing the water from mixtures of water and various organic liquids than heretofore possible.

Another object of the present invention is to provide a new and improved apparatus which can be used for more completely dehydrating organic liquids and which apparatus is readily installed and operated at significant savings compared to contemporary and prior apparatus available.

Yet another object of the present invention is to provide a new and improved apparatus of the character described wherein the vapor pressure of the water to be removed is reduced by mechanical withdrawal of the water-vapor from a vapor space above a liquid-vapor interface.

Another object of the present invention is to provide a new and improved apparatus for removing water from organic liquids, which apparatus is especially adapted for use with glycol-type dehydrating agents commonly used in natural gas dehydrators.

Another object of the present invention is to provide a new and improved organic liquid dehydrating apparatus which is capable of reducing the amount of water in the liquid mixture considerably below that obtainable in present commercially available apparatus.

The foregoing and other objects and advantages of the present invention are accomplished in an illustrative embodiment which comprises a new and improved apparatus for dehydrating a liquid mixture of organic liquid and water including a closed vessel having a lower, liquid space for holding a quantity of the liquid mixture and an upper, vapor space for holding vapor in direct contact with the surface of the liquid to thereby form a liquid-vapor interface. Means in communication with the vapor space is provided for reducing the partial pressure of water-vapor therein below an equilibrium pressure across the liquid-vapor interface whereby additional moisture in the liquid mixture is vaporized and flows into the vapor space, resulting in a reconcentration or further dehydration of the organic liquid in the liquid space of the vessel. Means is provided for collecting and removing this water from the vessel.

For a better understanding of the present invention, reference should be had to the following detailed description taken in conjunction with the appended claims and the drawings, in which:

FIG. 1 is a vertical sectional view extending longitudinally through a new and improved apparatus for the dehydration of organic liquids constructed in accordance with the present invention;

FIG. 2 is a transverse cross-sectional view taken substantially along lines 2—2 of FIG. 1;

FIG. 3 is a vertical, longitudinal, sectional view taken of another embodiment of a new and improved aparatus for the dehydration of organic liquids constructed in accordance with the present invention; and FIG. 4 is a transverse sectional view taken substantially along the lines 4—4 of FIG. 3.

Referring now, more particularly, to the drawings and the embodiment shown in FIGS. 1 and 2, therein is illustrated an improved apparatus 10 for dehydrating organic liquids, such as hydrocarbons, fuels, glycols, gasolines, liquid propane, etc. The apparatus 10 comprises an elongated, closed, generally cylindrical, pressure vessel 12 disposed with its longitudinal axis lying in a horizontal plane. A lower portion of the vessel 12 comprises a liquid-holding space 14 for maintaining a quantity of wet, organic liquid, for example, diethylene or triethylene glycol, which is to be dehydrated or reconcentrated. An upper portion of the vessel 12 comprises a vapor space 16 adapted to contain water and organic liquid in vapor form, and the junction of vapor space 16 and liquid space 14 is defined by a vapor-liquid interface designated by the letter A, which is approximately at the mid-level of the vessel 12 to provide a maximum area of direct liquid-vapor contact.

The triethylene glycol or other organic liquid which is to be dehydrated is introduced into the liquid space 14 of the vessel 12 through an inlet fitting 12a at the lower righthand end of the vessel, as viewed in FIG. 1, and flows generally from the right to left through the vessel. Reconcentrated or dehydrated liquid leaves the vessel via an outlet fitting 12b at the lower left-hand end after almost all of the moisture or water therein has been removed.

In order to aid in the vaporization of the liquid mixture contained in the lower, liquid section 14, across the interface area A and into the vapor space 16, the vessel 12 is provided with a plurality of transversely extending, alternate, upper and lower baffles 18 and 20, respectively. The liquid mixture flowing into the vessel, generally from the right to left, moves underneath the lower edges of the baffles 18 and over the upper edges of the baffle 20 so that the surface of the liquid at the vapor-liquid interface A is continuously agitated and turbulent, thus aiding in vaporization of the liquid across the interface area. The curved arrows B and C in FIG. 1 illustrate the general path of the liquid in the lower section 14 of the vessel as it passes from the right to left.

In order to better circulate the fluid within the lower, liquid section 14 of the vessel 12, to promote more complete vaporization of the water therein, the vessel 12 is provided with an elongated hollow conduit 22 which extends through openings in the baffles 18 and 20. The conduit 22 is spaced above the lower edge of the vessel, and in order to recirculate or pass liquid through the conduit from left to right (arrows D) in opposite direction to the external flow, a circulating propeller or mixing screw 24 is mounted on a shaft 26 at the right-hand end of the vessel. The conduit is open at both ends and the shaft 26 extends into the right-hand end and is driven by a motor 28 externally mounted on an end plate 29 of the vessel 12.

When the motor is energized, the propeller or mixing screw 24 is rotated to recirculate liquid from the left-hand end of the vessel toward the right to provide forced circulation of the fluid in the liquid space 14. This forced circulation in combination with the upper and lower baffles 18 and 20 provides for excellent surface turbulence and better vaporization of the water from the liquid section 14 across the liquid-vapor interface A.

In accordance with the present invention, the triethylene glycol or other organic liquid which contains an objectionable percentage or content of water therein is introduced into the closed vessel 12 and circulated as described. At the interface area A, molecules of organic liquid and water from the liquid section 14 move upwardly into the vapor space 16 which contains a mixture of water-vapor and the vapor of the organic liquid and, conversely, molecules in the vapor space 16 move downwardly into the liquid section 14 across the interface A. The sum of the partial pressures of the several constituents or components in the mixture add up to the total pressure in the vapor space 16 in the vessel 12. When the pressure in the vapor 16 is at equilibrium pressure, the number of molecules moving upwardly across the liquid-vapor interface is exactly equal to the number of molecules moving downwardly, or, in other words, the amount of liquid condensed from vapor is equal to the amount of vapor formed from liquid.

Because of the difference in boiling points between water and the organic liquid in which it is mixed in the vessel 12, the equilbrium concentration or percentage of water in the vapor space 16 is much greater than the percentage of water in the liquid mixture in the liquid space 14.

In accordance with the present invention, the vapor space 16 of the vessel 12 is in communication with an elongated horizontally disposed condenser shell 30 having an axis parallel with and offset laterally of the vessel 12. The interior of the shell 30 is in communication with the vapor space 16 of the vessel through a plurality of vapor outlet ports 16a formed on the top of the vessel 12, and the ports are connected to elbow conduits 32 having outer ends 32a in communication with openings found in the side condenser shell. Vapors moving upwardly from the liquid-vapor interface area A, as indicated by the arrows E, fill the vapor space 16 and pass through the elbow conduits 32 to fill the condenser shell 30.

The condenser shell is adapted to enclose an elongated bundle of tubes comprising a plurality of hairpin or U-shaped heat exchanger conduits 34 which extend substantially the entire length of the shell from te left-and end thereof. The right-hand end of the shell 30 adjacent the bight portions or bend ends of the U tubes 34 is closed by a rounded end member 31, and the left-hand end of the shell is provided with a flange plate 36 having openings therein for the ends of the tubes 34. A distribution chamber 38 having an end flange 40 is mounted on the flange plate 36 at the left-hand end of the shell, and a horizontal divider wall 42 is provided in the chamber to form separate upper and lower sections therein. The lower section of the chamber 38 is in communication with the lower or inlet ends of the legs of the U tubes 34 while the upper section of the chamber above the divider 42 is in communication with the ends of the upper legs of the U tubes. Fluid is introduced into the lower section of the chamber 38 through an inlet port structure 38a and passes into the lower legs of U tubes 34 flowing from left to right. At the far or right-hand end of the tubes 34, the flow direction is reversed and the fluid returns in the upper legs of the tubes from right to left, entering the upper section of the chamber 38 above the divider 42 and passing from the chamber via an outlet port structure 38b.

The bundle or plurality of U-shaped or hairpinlike tubes 34 disposed within the condenser shell 30 form a heat exchanger, and vapors in the condenser shell 30 condense in liquid form on the outer surfaces of the tubes. The condensed liquid gravitates to the bottom of the shell in liquid droplets but does not flow back into the vessel 12 through the elbow connectors 32 because the openings 32a are in the side of the shell and spaced above the bottom. The liquid condensate collects and flows along the bottom of the shell and drops into a vertically disposed standpipe or sump 44 which is in direct communication with the interior of the condenser through an opening 30a, as shown in FIG. 2.

While the bundle of U-shaped tubes 34, as described, comprises one preferred embodiment of a condenser suitable for the present invention, it is to be understood that other types of heat exchanger arrangements could be used without departing from the spirit and scope of the invention. For example, a single or multi-pass finned tube element could be used and the element could be positioned in the vapor space 16 of the vessel 12 rather than in a separate condenser shell. If the element is positioned within the vessel 12, a collecting trough is placed beneath the element for collecting condensed liquid which is then discharged from the vessel.

In the illustrated embodiment wherein a separate condenser shell 30 is employed, vapors from the vapor space 16 of the vessel pass through the elbow conduits 32 and flow into the condenser shell 30. These vapors come in contact against the relatively cold surfaces of the bundle of hairpinlike U tubes 34 and condense out in liquid droplets thereon. Condensation tends to reduce the volume and the pressure of the vapor in space 16 and, in order to restore equilibrium conditions, the liquid phase generates water and glycol vapor to replenish the supply. Since water concentration in the vapor is greater than water concentration in the liquid, continuing vapor generation tends to exhaust water from the liquid phase.

FIGS. 1 and 2 illustrate the apparatus 10 as it is used in connection with a gas dehydrator for a gas well, wherein the apparatus is connected into the system for dehydrating a liquid desiccant, such as diethylene glycol or triethylene glycol, as it returns from the gas dehydrator laden with moisture picked up from the natural gas. The rich glycol (desiccant) flows through a suitable return conduit 46 into the inlet port structure 38a of the distribution chamber 38 on the left-hand end of condenser shell 30. In a typical installation, the returning wet glycol is at a temperature of approximately 100° F. and contains about two percent moisture. The wet glycol flows into the lower section of the chamber 38 and from there passes into the lower legs of the hairpin-type tubes 34 in the condenser shell 30 flowing from left to right. Upon reaching the far end bight portions of the tubes in the bundle, the flow direction is reversed and the fluid flows from right to left in the upper legs of the tubes and passes into the upper section of the chamber 38.

Because the temperature of the wet glycol is normally about 100° F., and this temperature is less than the temperature of the glycol and water-vapor in the condenser 30, the water-vapor begins to condense out in liquid form on the tubes 34 and is eventually collected in the standpipe or sump 44, as previously described. As condensation occurs, the wet glycol in the tubes 34 picks up heat and is raised in temperature. For example, the glycol may reach a temperature of about 125° F. as it flows into the upper section of the chamber 38 and passes through the outlet port 38b into a conduit 48. The conduit 48 is connected to the inlet side of a heat exchanger 50 mounted in a vertical tower or distillation column 52 of a reboiler or glycol regeneration still, generally indicated by the reference numeral 54. The wet glycol passes through the heat exchanger 50 and again is elevated in temperature to approximately 160° F. before leaving the column 52 via a conduit 56. The conduit or pipe 50 is connected to the inlet of a second heat exchanger coil 58 wherein the temperature of the glycol is further elevated to about 330° F. The heat exchanger coil 58 is positioned within a jacket 60, through which reconcentrated or dry glycol taken from the outlet end 12b of the vessel 12 is directed via a conduit 62. The dry glycol from the vessel 12 passes through the jacket 60 losing heat to the wet glycol flowing in the coil 58 and then passes into a dry glycol supply conduit 64 for delivery to a gas contactor or other using apparatus. After the wet glycol passes through the coil 58 it flows via a conduit 66 into a discharge nozzle 68 positioned in the column 52 above a section therein filled with packing material 70. The wet glycol is discharged at the upper end of the packing material 70 and as it flows downwardly in the column rising hot vapors strip out or boil off the water which, along with other hot gases, passes over the heat exchanger 50 and is discharged through an outlet 52a at the upper end of the column. The glycol, having a much higher boiling point than water, gradually gravitates downwardly through the packing material 70 and collects in the bottom of the column or sump portion 72. Heat is supplied to the reboiler 54 through a fire tube 74 fired with a burner which is supplied with fuel from the associated well. The fire tube 74 is mounted in a reboiler vessel 76 which is connected to the distillation column 52 and the sump 72, respectively, via a lower conduit 78 and an upper conduit 80. The glycol is maintained at a relatively high reconcentration temperature in a range of approximately 350° to 375° F. in the reboiler 76 and, accordingly, most of the moisture therein is boiled out. The reconcentrated glycol is taken from the reboiler vessel 76 and directed into the inlet 12a of the vessel 12 through a conduit 82, and in the vessel 12 further reconcentration by removal of additional moisture takes place, as previously described.

Truning momentarily to FIG. 2, noncondensable vapors and gases evolved from the liquid or which have leaked into vessel 12 or have been purposely introduced therein to strip water from the liquid phase and which vapors move into the condenser shell 30 are drawn off from the condenser through an outlet fitting 30b adjacent the right-hand end by means of a pump or eductor 86 and conduit 88. These noncondensable vapors and gases are pumped by the eductor or pump 86 through a line 90 and check valve 92 into a line 94 and check valve 96. The line 94 is connected to the conduit 66 leading to the inlet nozzle 68 in the column 52 and the noncondensable vapor and gas thus are introduced into the column and eventually are exhausted through the outlet 52a.

The condensate collected in the bottom of the standpipe 44 is withdrawn through a conduit 97 and condensate pump 98 and is directed into the branch conduit 94 via a line 100 and a check valve 102. In addition, a bypass line 104 is provided so that fluid can be returned to the standpipe 44, if desired, to control the level of liquid therein. For this purpose, a valve 106 is provided in the bypass line 104 and the valve is controlled by a float mechanism 108 mounted in the lower end of the standpipe. The float mechanism is operable to actuate an electric or pneumatic switch 109, which in turn is responsible for energizing the valve 106 to open and close the bypass conduit 104. The switch 109 also can be used for controlling the operation of the vapor pump 86 so that excessive noncondensable vapors do not accumulate in the vapor space 16, condenser shell 30, and standpipe 44 and suppress condensation.

The vacuum pump 86 or eductor may also be operably controlled by a pressure sensitive switch 109 which energizes the eductor to pump noncondensed vapors, such as air and natural gas, from the condenser shell into the column 52 to thereby maintain a slight negative pressure in the condenser shell 30. This negative pressure aids in the evaporation of moisture from the liquid mixture in the liquid section 14 and helps in the condensation of water-vapor on the hairpin like tubes 34 so that more condensate is collected in the lower end or sump of the standpipe 44. The pump 98 is adapted to pump the collected condensate from the lower end of the standpipe 44 into the column 52 wherein the water is vaporized by using hot gases and eventually passes out through the column vent 52a.

In a typical installation wherein a desiccant like triethylene glycol is used for drying well fluid flowing in a contactor apparatus of a gas dehydrator, arrow F (FIG. 1) indicates a flow point representing the glycol as it is returning from the gas contactor through the conduit 46 laden with moisture and ready to enter U tubes 34 in the condenser shell 30. In a typical operating condition or situation, the temperature of the returning wet glycol is approximately 100° F., the flow rate is 27,225 pounds per hour (p.p.h.) or 49.2 gallons per minute (g.p.m.), and the concentration of the liquid 97.4% pure glycol, and the remainder, water and other impurities. As the wet glycol passes through the hairpinlike tubes 34 in the condenser shell 30, it picks up heat and is raised in reaching approximately 124° F. at the flow point indicated by the arrow G in the conduit 48. The wet glycol enters the heat exchanger 50 in the upper end of the column 52 and again picks up heat eventually leaving the heat exchanger via the conduit 56. Arrow H indicates the flow leaving the heat exchanger 50, and at this stage in the process the glycol temperature has been elevated to approximately 160° F. The wet glycol passes into a final heat exchanger 58 before it is introduced into the column 52. Again the glycol picks up heat in the heat exchanger 58 and is further elevated in temperature to approximately 336° F., as represented by the arrow I along the conduit 66 as it leaves the heat exchanger to flow into the nozzle 68 above the packing 70 in the column. The wet glycol, at approximately 336° F., is introduced into the flow of gases in the column and filters down through the packing 70 and eventually collects in the sump 72 and reboiler 76.

The glycol in the reboiler vessel 76 is maintained at approximately 350° to 375° F., and most of the water and water-vapor in the glycol is driven and boiled off to flow upwardly in the column 52 through the condenser packing 70. The wet glycol introduced into the column 52 via the dispersion nozzle 68 filters downwardly through the packing material 70 wherein the water and water-vapor are stripped from the glycol by the rising high temperature gases flowing upwardly. Concentrated triethylene glycol collects in the reboiler 76 or sump 72 of the still 54 and is ready for delivery via the line 82 into the inlet fitting 12a of the vessel 12. The arrow J indicates the flow of reconcentrated glycol into the vessel, and at this point the flow rate is approximately 27,700 p.p.h., the temperature is approximately 375° F., and the fluid has a concentration of about 99% pure glycol.

In accordance with the invention, the apparatus 10 is adapted to reduce the moisture content in the mixture even further so that the reconcentrated glycol leaving the heat exchanger 60 through the line 64, as indicated by the arrow K, will have a concentration of approximately 99.7% pure glycol. The flow rate at this point is about 26,650 p.p.h. and the temperature of the glycol is approximately 200° F.

It will thus be seen that the apparatus 10 of the present invention is able to further reconcentrate the triethylene glycol from a 99% concentration entering the inlet section 12a of the vessel 12 to a 99.7% concentration as the glycol leaves the outlet section 12b without increasing the temperature above normal distillation levels.

In the condenser shell 30, the wet glycol returning through the conduit 46 enters the lower section of the chamber 38 at a temperature of approximately 100° F. and flows through the U tubes or hairpinlike tubes 34 which form a cold, enlarged finger or condensing surface in the shell. Vapors in the shell around the tubes condense on the cold surfaces giving up heat to the glycol and during this process the temperature of the wet glycol is raised to approximately 124° as the fluid leaves through the outlet 38b. Because of the condensation on the U tubes in the shell, glycol, water and noncondensable gases and vapors are evolved at a greater rate across liquid-vapor interface A between the liquid space 14 and vapor space 16. At a standard day sea level pressure of 29.92 inches of mercury, water boils at 212° F. and at lower pressure the boiling point is reduced. If the pump 86 is operating, or in the relative absence of noncondensable gases, the pressure in the vapor space 16 is less than atmospheric pressure and almost always less than 29.92 inches of mercury, so that the boiling temperature of the water in the liquid mixture is around 180° F. to 200° F. The water-vapor rises upwardly from the liquid-vapor interface A, as indicated by the arrows E, and flows through the elbows 32 into the condenser shell 30. The vapors contact the relatively cold surface of the tubes 34 and are condensed into liquid form. This condensate forms into droplets and eventually gravitates into and collects in the lower end or sump of standpipe 44. The pump 98 removes the condensate, as shown by an arrow L, via the line 94 and eventually into the column 52. The condensate contains about 80% condensed triethylene glycol and about 20% water, and the mixture is at a temperature of approximately 120° F. and flows at a rate of about 1050 p.p.h. into the column 52 from the standpipe 44.

As previously stated, the noncondensable vapors and gas evolved in the vessel 12 are pumped by the pump or eductor 86 to flow, as indicated by the arrow M, through the lines 90 and 94 into the column 52. Where there are no noncondensable gases present, the eductor or pump 86 is not required if means are provided for purging air from the system on start-up.

From the foregoing it will be seen that the apparatus 10 of the present invention provides a means for better reconcentration and dehydration of organic liquids and, as specifically shown in the example described, an organic liquid like triethylene glycol used for dehydrating natural gas can be reconcentrated from a 99% concentration to a 99.7% or higher concentration in accordance with the invention, thus providing a higher reconcentration than heretofore practicably possible and at relatively low operating costs. Cooling for condensation may be obtained from extraneous sources such as air, water, refrigerants, etc., in addition to the liquid feed as illustrated here. Experience has shown that it is best to refrain from freezing moisture on the condensing surface in most applications, although the scope of this invention is not limited in this respect.

Referring now to FIGS. 3 and 4 of the drawings, therein is illustrated another embodiment of the present invention which is referred to generally by the reference numeral 110. In the embodiment shown in FIGS. 3 and 4, reference numerals 100 units higher than the numerals used in the previous embodiment will be used in describing components of the apparatus, which are identical or similar to those of the previous embodiment.

Instead of an elongated condenser shell with a plurality of U tubes in a bundle arrangement therein, the apparatus 110 includes one or more fluid powered eductor pumps 130. The pump is connected to the middle outlet 116a of the vapor space 116 on the vessel 112 and helps to draw vapors generated in the vessel upwardly across the liquid-vapor interface A. The eductor pump 130 is supplied with power fluid from the return conduit 146 and the power fluid used may be wet glycol returning from a gas dehydrator or other apparatus with which the apparatus 110 is associated or any other suitable power fluid. The power fluid or wet glycol flowing through the eductor pump 130 draws off gases evolved from the liquid mixture and flowing into the vapor 116 of the vessel 112 by the eductor 130 are mixed with the space below the normal equilibrium pressure. This results in more moisture or water being evaporated across the liquid vapor interference A and, consequently, a higher reconcentration of the liquid glycol in the liquid space 114 of the vessel. The hot vapors drawn from the vessel 112 by the educator 130 are mixed with the power fluid or wet glycol and flow through the line 148, as indicated by the arrow G, into a heat exchanger 150 in a manner similar to that described in connection with the previous embodiment. The use of an eductor pump 130 eliminated the need for a condenser shell, U-tube bundle, standpipe, etc., and is useful in installations wherein the water load in the returning glycol is relatively constant and the flow rate is relatively constant. The reduction of pressure in the vessel 112 by pumping the hot evolving vapors from the vapor space 116 in the vessel 112 results in considerable vapor generation and, consequently, further dehydration or reconcentration of the liquid in the liquid space 114. Because the vapor pressure of the water above the interface A is decreased by the pumping action, more water molecules move upwardly across the vapor-liquid interface into the vapor space 116. Noncondensable gases are also drawn off from the vessel 112 by the eductor pump 130 and these gases are ultimately discharged in the nozzle 168 in the column 152 of the reboiler unit or still 154. The noncondensable gases, along with water, pass out the upper end or vent pipe 152a of the column 152, and the degree of dehydration or rate of vaporization in the vessel 112 is readily controlled by adjusting the power fluid flow rate through the eductor 130.

In an operating example, the wet glycol or power fluid returning from an associated gas dehydrating apparatus passes into the eductor 130 through the return conduit 146, as indicated by the arrow F, at approximately 100° F. The eductor 130 draws hot vapors from the vapor space 116 of the closed vessel 112, and the mixture of hot vapors and wet glycol passes into the heat exchanger 150 through the conduit 148, as represented by the arrow G, at a raised temperature of approximately 134° F. The mixture flows through the heat exchanger 150 and is heated to approximately 170° F. and then flows through the piping or conduit 156, as indicated by the arrows H, into a heat exchanger coil 158. The heat exchanger coil 158 is enclosed in a jacket 160 which is heated by reconcentrated glycol flowing from the outlet 112b of the vessel 112, as indicated by the arrows K, and the gas and glycol mixture leaving the heat exchanger coil 158 via the conduit 166 is at a temperature of approximately 310° F. This high temperature mixture is introduced into the column 152 of the still or reboiler unit 154 through a nozzle 158 and filters down through the packing material 170, eventually collecting in the lower end portion or sump 172. The sump is connected to a reboiler vessel 176, maintained at approximately 350° to 375° F. by a fire tube 174, and this temperature range is effective to reconcentrate the glycol, which is then passed through a line 182, as indicated by the arrow J, at a temperature of approximately 350° to 360° F. and a concentration of about 99% glycol into the inlet end 112a of the closed vessel 112. In the vessel 112 additional moisture and water-vapor are removed from the liquid glycol, as described, and the glycol leaves via the exit fitting 112b and conduit 162, as indicated by arrow K, at approximately 344° F. The hot reconcentrated glycol passes through the outer jacket 160 around the heat exchanger coil 158 giving up a portion of its heat to the wet fluid flowing internally through the heat exchanger coil. The dry glycol is discharged from the jacket 160 via a supply conduit 164, as indicated by the arrow K, at a temperature of approximately 200° F., and the glycol is in highly reconcentrated or purified condition comprising approximately 99.7% pure glycol.

The eductor pump 130 uses the returning wet glycol from the return conduit 146 as power fluid for pumping out or withdrawing the hot vapors generated in the vapor space 116 across the interface area A and, accordingly, the vapor pressure of the water is reduced below that of equilibrium so that additional water and water-vapor are boiled out or evolved from the liquid and pass from the liquid section 114 into the vapor space 116 of the vessel. This action further reduces the water content of the liquid glycol in the liquid section 114 of the vessel 112 and affords a highly reconcentrated desiccant ready for use in a gas dehydrator or other apparatus.

While in the foregoing descriptions we have referred specifically to triethylene glycol, it is to be understood that the invention is useful in dehydrating various other organic liquids, such as propane, alcohols, ethers, etc., and, of course, when used with various other liquids having different vapor pressures and condensation points, different figures will result.

In applications of the invention, the liquid to be dried is charged at a temperature level which corresponds to the pressure that the system requires in order to provide the vapor phase for operation of the drier. Whereas the examples cited here for dehydration of triethylene glycol specify operation at essentially atmospheric pressure and 350–400° F., if propane were to be dried in a similar device installed in a flow line between the propane fractionator and the storage tanks, the pressure would likely be in the order of 180–225 p.s.i.g. and the temperature of the dehydrator would need to be slightly in excess of 100° F. to form the vapor phase. If, in another case, this drier were installed in a propane transmission system to work at an operating pressure of 400 p.s.i.g., the drier would need to be heated to 160–170° F. to form the vapor phase and operate properly. In some applications, it may be necessary to supply heat for vapor generation from some extraneous source, such as steam, hot oil, or any other suitable fluid medium applied via coils located in the liquid section of the horizontal vessel.

Also, in drying liquids such as propane, which form a two-phase liquid mixture with water when solubility limits are exceeded, the distillation recovery system described for the glycols is not needed. Instead, the water-rich vapor is condensed and collected to form a free-water phase which is then decanted and discarded. The water-saturated propane phase is then returned to the inlet of the drier along with fresh feed. It has been found, however, that the method of the present invention is extremely useful in providing a low-cost operation at minimal, fixed machinery costs for achieving a higher reconcentration or removal of water from organic liquids.

As the present invention has been described by reference to several embodiments thereof, it will be apparent that numerous other modifications and embodiments will be devised by those skilled in the art which will fall within the true spirit and scope of the present invention.

What is claimed as new and desired to be secured by Letters Patent of the United States is:

1. Apparatus for dehydrating a liquid mixture of organic liquid and water comprising a closed vessel having a lower liquid space for holding a quantity of said liquid mixture and an upper vapor space for holding a volume of vapors of said mixture in direct contact with the surface of said liquid and forming a liquid-vapor interface, means in communication with said vapor space for reducing the partial pressure of water vapor therein below equilibrium whereby water in said liquid mixture is vaporized to leave said liquid mixture and pass into said vapor space, liquid circulation means for maintaining continuous liquid movement and agitation along said liquid-vapor interface comprising a plurality of vertical baffles spaced longitudinally apart and transversely of said closed vessel, at least some of said baffles being disposed to extend above and below the level of said liquid-vapor interface, means for moving said vapor away from said interface in said vapor space, means for condensing said vapor, and some means separate from said vessel for collecting and removing water condensate from said vessel, an open ended tubular conduit means within said liquid space extending through said baffles and means for circulating liquid through said conduit means from and back to said liquid space.

2. A system for dehydrating a liquid mixture containing water comprising a vessel having a liquid space for holding a quantity of said mixture and a vapor space thereabove for containing vapor evolved from said liquid, said liquid and vapor spaces dividing said vessel along a liquid-vapor interface, a plurality of horizontally spaced apart baffles extending above and below said liquid-vapor interface across said vessel, open ended conduit means in said liquid space below said interface for returning said liquid mixture through said baffles from one end of said vessel to the other, means for circulating said liquid mixture through said conduit means, means in communication with said vapor space for reducing the partial pressure of water vapor therein below and equilibrium level whereby water in said liquid mixture vaporizes and passes upwardly through said interface into said vapor space, and means for collecting and removing water from said vessel.

3. The apparatus of claim 2 wherein said last mentioned means includes fluid powered eductor means for reducing the pressure in said vapor space by removing vapors therefrom.

4. The apparatus of claim 3 wherein said eductor means is powered by a flow of said liquid mixture before said mixture is introduced into said liquid space in said vessel.

5. The apparatus of claim 2 wherein said last mentioned means includes a condenser chamber in communication with said vapor space, a heat exchanger in said chamber for reducing the temperature of said water vapor to cause said water vapor to condense into liquid form, and means for removing said condensed water vapor from said chamber.

References Cited

UNITED STATES PATENTS

| 3,288,685 | 11/1966 | Kemper et al. | 203—11 |
| 3,399,118 | 8/1968 | Williamson | 202—173 |

FOREIGN PATENTS

| 6,094 | 1884 | Great Britain | 202—173 |
| 553,815 | 6/1932 | Germany | 159—1C |

NORMAN YUDKOFF, Primary Examiner

J. SOFER, Assistant Examiner

U.S. Cl. X.R.

202—177, 180, 198